United States Patent Office 2,865,735
Patented Dec. 23, 1958

2,865,735

PROCESSES FOR REDUCING THE SULPHUR CONTENT IN IRON AND FOR ECONOMIZING IN COKE IN CUPOLA FURNACES

Helmut Timmerbeil, Hagen-Haspe, and Hugo Querengasser and Werner Krauss, Knapsack, near Cologne, Germany, assignors to Knorr-Bremse G. m. b. H., Munich, Germany, a German company No Drawing. Application August 24, 1956
Serial No. 605,952

4 Claims. (Cl. 75—55)

The present invention relates to processes for reducing the sulphur content and for economizing in coke in cupola furnaces.

Hot blast cupola furnaces have hitherto been used for smelting grey iron and malleable cast iron and also for producing sow iron for the production of cast steel. Owing to the considerable blast pre-heating at 400° C. and more, a saving of coke to the extent of 30% and more is achieved as compared with cupola furnace working with cold blasts. Furthermore, owing to the relatively small quantities of coke used with a hot-blast furnace as compared with a cold-blast cupola furnace, it is possible to have sulphur contents of 0.1% S and less in the hot-blast furnace, i. e. the sulphur contents are approximately 30% less than in the case of iron produced in a cold-blast furnace.

Other known processes for the desulphurization of iron are carried out by means of calcium carbide. Desulphurization with calcium carbide generally takes place in a ladle and calcium carbide is blown-in, in powder form, or charged in lumpy form. Such processes are relatively cumbersome and unsatisfactory, especially since the drop in temperature of the iron causes difficulties from the casting technique point of view.

It is also known to charge calcium carbide into an electric furnace in order to desulphurize iron with the help of the lime-containing slag formed by the calcium carbide.

Calcium carbide has also been used as a so-called seeding substance in the manufacture of grey cast iron.

It is also known to charge calcium carbide into a cupola furnace in order to obtain a cupola furnace iron which is low in sulphur.

Heretofore, a carbide has been used which is prepared to have a high available gas content. These carbides however, had a very high melting temperature of 1,800° C. and above.

When such a carbide with a melting temperature of 1,800° C. is introduced into a cupola furnace it is found that the iron in the cupola furnace is only influenced (i. e. the calcium carbide introduced only reacts), at a relatively late stage, namely after a certain number of charges. In fact, the reaction takes place when it is possible to provide above the tuyere level in the cupola furnace, such a temperature that the melting point of the carbide is reached. Thus, if a calcium carbide having a melting point of 1,800° C. or above is used in a cupola furnace, it is necessary to achieve a melting temperature of 1,800° C. in order to bring the carbide into action.

According to the present invention there is provided a process for reducing the sulphur content in iron and for economizing in coke in cupola furnaces including the step of introducing into the cupola furnace calcium carbide whose melting point is lower than 1,800° C.

The speed of reaction of the carbide in the cupola furnace is increased quite considerably. It could not be foreseen that a carbide with a lower melting point and which is up to 10% and more lower than in the case of calcium carbide with a melting point of over 1,800° C., would prove to be more advantageous for charging into a cupola furnace than a carbide having a melting point of over 1,800° C. and a gas yield of at least 300 liters per kgm.

A carbide with a melting point of below 1,800° C. and if possible between 1,650 and 1,700° C. is added to the cupola furnace charge in quantities of approximately up to 4% by weight of the iron and preferably in quantities of approximately 2% by weight of iron.

The heat released in the cupola furnace by the decomposition of the carbide makes it possible to effect considerable economies in coke. For example, with a 2% carbide addition, using carbide with a melting point of between 1,650 and 1,700° C. there is a saving of 30–50% in coke, and the temperature of the liquid iron does not drop as compared with the charge which is melted down without carbide. In accordance with this lower quantity of coke, the sulphur content is also 30–50% lower than would have been in the case of cupola furnace iron which had been melted without carbide and with a correspondingly larger amount of coke. At the same time the efficiency of the cupola furnace is correspondingly increased owing to the lower consumption of coke.

Owing to the high melting temperature which is achieved at and above the tuyere level, the cupola furnace iron is carburized to a higher carbon content than is the case with a melting operation carried out without the use of carbide. Therefore, in order to obtain high-quality types of iron it is possible to reduce the proportion of pig iron, i. e. to increase the proportion of scrap, and thus to make the cupola furnace operation more economical.

The use of calcium carbide with a melting point lower than 1,800° C. has the further advantage that this carbide has a much greater and more rapid reactivity than a carbide having a relatively high melting point of 1,800° C., and above.

With the use of calcium carbide, temperatures are produced in the charge above the tuyeres of the cupola furnace which could only be achieved otherwise in so-called hot blast furnaces using a blast pre-heating of 400 to 500° C. and above. These high temperatures bring the silica to reduction temperature whereby, owing to the reduction of $SiO_2$, for example from the slag, a melting loss of silicon from the charge is prevented, and this also contributes to enabling the cupola furnace to be operated more economically.

With the use of calcium carbide with a relatively low melting point of 1,650 to 1,700° C. the iron temperatures at the tapping point of the furnace are in no case lower than the tapping temperatures in cases where calcium carbide with a relatively high melting point of 1,800° C. and above are used, using the same quantity of coke. However, by reducing the quantity of coke by 30 to 50% and with the use of 2% of calcium carbide calculated with respect to the iron charge, it is possible to obtain the same tapping temperatures as in the case of melting with 30% to 50% extra quantity of coke and without the use of calcium carbide. The whole furnace operation, inter alia the burning-out of the lining, owing to the economic and metallurgical results obtained owing to the relatively low coke consumption in the cupola furnace, and with the relatively low sulphur content which results therefrom, is exactly the same as in the case of cupola furnaces which are operated with hot blasts. The calcium carbide is expediently added in the form of lumps into the charge of the cupola furnace. In order to be effective the lump size must be sufficiently large to prevent the lumps from being carried out by the blast.

It is also possible to charge, or blow-in through the tuyeres or above the tuyeres, calcium carbide in the form of lumps or a powder into the melting chamber. It is also possible to add calcium carbide to a hot-blast cupola furnace and thus achieve economies, over and above the economies achieved by the hot-blast working, by economizing in coke, and also to obtain the aforesaid metallurgical advantages, such as for example, a further lowering of the sulphur content.

Of course, it is also possible to use calcium carbide with a low melting point in a cupola furnace with a basic or neutral lining, and where appropriate, a basic or neutral slagging process is advantageous. Calcium carbide is of course melted down in conjunction with the usual lime additions used in cupola furnace working.

In order to reduce the sulphur content in the iron, the calcium carbide having a relatively low melting point or the calcium carbide together with inert additives can either be added in the ladle or can be added in a basic or acid electric furnace or in a rotary furnace.

It has also been found that an equally good effect could be reached if further quantities of inert solid substances which lower the melting point were added to the carbide whose melting point is less than 1,800° C. and preferably between 1,650 and 1,700° C. Calcined lime, thoroughly mixed with the carbide, has been found to be particularly advantageous, since this accelerates still further the action of the carbide in the cupola furnace in a most desirable manner, and the main reaction of the carbide takes place as far as possible already in and immediately below the melting plane of the cupola furnace. Therefore, the effect of the carbide having a low melting point is not shown only after 5 to 7 charges, as in the case where normal carbide with the high melting point is used, but is perceptible already in the first charge on ladle, i. e. at the first tapping.

However, the same effect can be achieved by using normal commercial carbide and lowering the melting point by adding inert solid substances which lower the melting point of the carbide, more particularly calcined lime, and there is thus obtained a carbide having a relatively low melting point, preferably 1,650–1,700° C. The carbide is introduced in the known granular size into the cupola furnace along with calcined lime. The calcined lime is expediently used in approximately the same granular size as that of the carbide. The low melting point calcium carbide or the calcium carbide with inert additives can alternatively be used in more or less large granular sizes or in powder form and can if necessary be blown into the furnace. However, it is also possible to use the inert additives in a different grain size from that of the calcium carbide.

The total effect of the carbide, more particularly the raising of the temperature in the melting zone, is still further improved if the carbide or the carbide with the inert additive is introduced in coverings. This achieves the result that the charged carbide, or the charged carbide mixed with calcined lime, is not decomposed by the water content of the combustion air. In damp weather conditions when the coke and the pig iron may be particularly moist, a premature decomposition would occur is calcium carbide were added without the use of any covering. This decomposition can be prevented by introducing the carbide, if necessary mixed with calcined lime, into the cupola furnace in combustible coverings, i. e. packed in plastic or paper sacks or bags or it can even be introduced in non-combustible coverings. A particularly suitable covering of this kind is sheet iron, the carbide being used thoroughly mixed with lime, and if necessary pressed into sheet metal packs, bundles of laminations or the like.

The advantage of packing the carbide into bundles of laminations or into metal sheeting, i. e. into a noncombustible covering material, resides in the fact that the carbide advances with the charge in the cupola furnace to the melting zone without being prematurely decomposed by the water content of the combustion air (furnace blast). In the melting zone the carbide is melted together with the charge, and in said melting zone the carbide can exert its temperature-raising and sulphur-reducing effect in the cupola furnace in a concentrated form. It has been ascertained that the process involving the use of normal commercial carbide with calcined lime, makes it possible to achieve the same technical advantages as with the use of carbide having a low melting point. It has been found more particularly that the sulphur content in the iron is reduced, by the addition of calcium carbide with calcined lime, by the same extent as economies in coke are achieved, so that additional deulphurization in the ladle can be dispensed with. Furthermore, the same advantageous and desirable carburization phenomena are found. The high melting temperature which is desirable in and directly under the melting zone or in the melting plane is also achieved, with the consequent advantageous increase in temperature of the sow iron. Moreover, a substantial increase in the efficiency of the cupola furnace is obtained owing to the reduced charge of coke.

For 1 ton of metal charge introduced into the cupola furnace and consisting of pig iron, broken castings, scrap and cyclic material, 20 kg. of normal commercial carbide of a grain size of approximately 5–50 mm., well mixed with 1.48 kg. of calcined lime of the same grain size, corresponding to 7.4% of the carbide, is added to the cupola furnace, the carbide-lime mixture being packed in thin-walled sheet metal drums. Also provided is the normal limestone addition of 3 to 6% of the quantity of iron, i. e. approximately 30 to 60 kg. The calcium oxide content of the calcined lime added to the carbide amounts to approximately 96%. The coke charge is for example 12.5% of the quantity of iron by weight while formerly the coke content amounted to approximately 19% of the quantity of iron without the use of calcium carbide with or without calcined lime. In accordance with the approximately 33–35% saving in coke, the amount of which is determined by the composition of the charge, the sulphur content of the sow iron drops from approximately 0.19% to 0.13%, i. e. by approximately the same proportion as the amount of coke saved.

The mixture of 100 parts of normal commercial carbide with 7.4 parts by weight of calcined lime, calculated relatively to the commercial carbide, has a melting point of approximately 1,700° C. But if to a 100 parts by weight of normal commercial carbide with 300 litres acetylene per kgm. of carbide, there is added 12 parts by weight of calcined lime, i. e. in a cupola furnace charge of 1,000 kg. iron, 20 kg. of normal commercial carbide and 2.4 kg. of calcined lime of the aforesaid grain size having a CaO content of approximately 96%, then the melting point of the mixture can be lowered to 1,650° C. With these temperatures the carbide, in conjunction with the calcined lime, is melted and therefore comes into action in the melting zone.

However it is not necessary to introduce into the cupola furnace, calcium carbide with a high melting point mixed with calcined lime, since it is also possible to introduce calcium carbide having a relatively low melting point, and the melting point of this carbide can be lowered further by adding calcined lime.

It should also be noted that the calcium carbide forms, with calcium oxide, unstable molecular compounds which correspond to various eutectic mixtures. At approximately 1,634° C. there is a minimum, with the lowest melting point. From this minimum the melting temperature again rises as the calcium oxide content increases, until a new maximum is reached. Consequently, with the carbide-lime mixtures having a relatively low melting point, two or more mixtures with different lime contents correspond to a specific temperature. These mixtures can be taken as solutions of unstable molecular compounds in the calcium oxide or vice versa.

The technical advance achieved by the present process consists in that both the calcium carbide with the lowered melting point and also the normal commercial carbide with a suitable lime addition are melted down with the rest of the charge owing to their low melting point, and the desulphurizing and temperature-increasing action of the carbide comes into effect immediately.

In addition this carbide addition achieves an increase in output which is approximately of the order of the saving in coke expressed as a percentage, and the said addition lowers the sulphur content of the sow iron substantially, the reduction of the sulphur content being of course dependent on the basicity of the slag.

With cupola furnaces having an acid lining, the slag must be kept acid, and the lowering of the sulphur content in the sow iron corresponds in percentage to the saving in coke as compared with cold-blast working without the use of calmium carbide tokether with calcined lime.

In the case of cupola furnaces having a basic lining or cupola furnaces having a neutral lining, for example consisting of a rammed carbon mass in the hearth, the desulphurizing effect of the calcium carbide having a lowered melting point can be increased quite considerably since the furnace can be operated with a highly basic desulphurizing slag. Therefore, it is also possible to pass almost all the sulphur into the slag and to obtain sow iron with sulphur contents of the order of approximately 0.01 to 0.02% and partly lower. The very high melting temperature before the tuyeres which is to be achieved by the use of calcium carbide in conjunction with calcined lime results in a good carburization, i. e. an increase in the carbon content of the sow iron and the resulting advantages from the point of view of quality.

The quantitative addition of calcium carbide having a lowered melting point or of calcium carbide mixed with calcined lime can, in the case of cupola furnaces having an acid lining, only be carried out up to the point where the slag is still predominantly acid, i. e. contains silica. Quantitatively therefore the percentage proportion of calcium carbide or carbide with a lime addition in the charge has an upper limit.

With cupola furnaces having a basic lining or a neutral lining, both of which allow a highly basic slagging process there are not limits to the quantitative proportion of calcium carbide or carbide mixed with calcined lime.

Under the expression "acid slag" there is to be understood a slag consisting of about 0.5 to 0.7 part of calcined lime and one part of silica. The expression "basic slag" stands for a slag consisting of about 1.8 to 2.2 parts of calcined lime and one part of silica. This must be considered when carbide is added. The addition of carbide is therefore limited in this respect.

The process for reducing the sulphur content in iron and for economizing in coke in cupola furnaces by using calcium carbide having a melting point lower than 1,800° C. preferably with a melting point of 1,650 to 1,700 ° C., thus affords not only significant metallurgical advantages, more particularly by obtaining relatively low sulphur contents and better carburization in conjunction with a high super-heating of the melt and consequent finer graphite separation, but also economic advantages since owing to the considerable saving in coke, taking into account the costs incurred by the use of calcium carbide, it is possible to reduce the production costs for the molten iron.

The present process will be explained in more detail in the following examples:

*Example 1.*—Into a cold-blast cupola furnace with acid lining and acid slag, a mixture of the following composition is introduced: 30% pig iron, 40% broken grey cast iron, 30% cyclic material=100% metal charge.

With the usual method of operation (without addition of carbide) 14.5% coke and 5.0% limestone are required for melting-down. In this way a sow iron of the following analysis is produced: 3.22% C, 1.82% Si, 0.55% Mn, 0.31% P, 0.13% S.

Carrying out the method of operation using low-melting point carbide, there was added to the same metal charge the following: 10.0% coke, 2.0% carbide (melting range 1650 to 1700° C., granular size 15 to 25 mm.) and 3.0% limestone—all percentage data are calculated on metal charge=100. There was produced a sow iron of the following composition: 3.40% C, 1.95% Si, 0.58% Mn, 0.32% P, 0.10% S. The furnace output was increased from an average of 4 tons per hour to 4.7 tons per hour, i. e. by 17%.

The effect of the addition of carbide having a low melting point in relation to temperature and sulphur content of the sow iron is apparent even at the first tapping. The low melting point carbide is entirely converted in the furnace; the bed coke which is thrown out after smelting is completed does not contain any carbide.

*Example 2.*—A mixture of the following composition is charged into a cold blast cupola furnace with acid lining and acid slag: 15% pig iron, 25% foundry scrap, 50% steel scrap, 10% cyclic material=100% metal charge.

With the usual method of operation (without carbide addition) 18.0% coke and 5.5% limestone are required for melting down. A sow iron of the following analysis is produced: 3.04% C, 1.06% Si, 0.30% Mn, 0.18% P, 0.16% S.

When the iron was melted down with the addition of low melting point carbide, there was added: 12% coke, 2.0% carbide (melting region 1,650 to 1,700° C., grannular size 25 to 50 mm.) and 3.5% limestone—all percentages are calculated on: metal charge=100. A sow iron of the following composition was obtained: 3.30% C, 1.15% Si, 0.32% Mn, 0.18% P, 0.11% S. The furnace output increased from an average of 3.2 to 4.5 tons per hour, i. e. by 29%.

*Example 3.*—Into a cold blast cupola furnace with acid lining and acid slag the mixture of Example 1 was charged, using a mixture of normal carbide (melting point about 2,000° C., grannular size 5 to 15 mm.) and burnt lime (grannular size 3 to 10 mm.); the mixture was charged into sheet metal boxes whose walls were formed with some holes of 2 mm. diameter in order to ensure equalisation of pressure at elevated temperatures. 10% coke, 2.0% normal carbide+0.15% burnt lime and 3% limestone were added. A sow iron of the following composition was obtained: 3.35% C, 1.91% Si, 0.57% Mn, 0.30% P, 0.10% S. Furnace output and effect of the carbide-lime mixture corresponding entirely to the findings in the case where low melting point carbide was used (Example 1).

*Example 4.*—In a cold blast cupola furnace with acid lining and acid slag the mixture from Example 1 was melted down with 10% coke and 3% limestone, whilst pulverulent carbide (melting range 1,650 to 1,700° C.) was blown in. The carbide powder (2% of the metal charge) was blown, into the blast wind, in nitrogen, as a carrier gas, with two injections of known construction, through two oppositely disposed nozzles. The sow iron had the following analysis: 3.37% C, 1.86% Si, 0.55% Mn, 0.33% P, 0.11% S. The furnace output went up by 15%.

*Example 5.*—When low melting point carbide (melting range 1,650 to 1,700° C.) of granular range 0.2 to 0.5 mm. was blown in, practically the same results were obtained as when powdered carbide was used (Example 4).

*Example 6.*—In a hot blast cupola furnace with lining of carbon ram mix and with basic slag, a mixture of the following composition was melted down: 20% broken castings, 50% steel scrap, 30% cyclic material=100% metal charge.

With the usual method of operation (without addition of carbide) 12.5% coke and 10% limestone were used. The sow iron has on an average the following composition: 3.50% C, 1.84% Si, 0.62% Mn, 0.05% P, 0.05% S.

The smelting process was changed over to the use of low melting point carbide, and the following were added: 8% coke, 2% carbide (melting range 1,700 to 1,750° C., granular range 5 to 15 mm.) and 8% limestone. A sow iron of the following composition was obtained: 3.60% C, 1.81% Si, 0.64% Mn, 0.04% P, 0.04% S. The furnace output went up from an average of 6 tons to 8 tons per hour.

What is claimed is:

1. A process for reducing the sulphur content of iron in a cupola furnace process requiring a series of coke charges comprising reducing the initial and subsequent charges of the coke by introducing therewith calcium carbide having a melting point of less than 1800° C.

2. A process as claimed in claim 1 wherein the calcium carbide has a melting point of from about 1,650–1,700° C.

3. A process for reducing the sulphur content of iron in a cupola furnace process requiring a series of coke charges comprising reducing the initial and subsequent charges of the coke by introducing therewith calcium carbide having a melting point in excess of 1800° C. mixed with calcined lime.

4. A process as claimed in claim 3 wherein the calcium carbide and calcined lime are in powered form and are blown into the cupola furnace.

References Cited in the file of this patent

UNITED STATES PATENTS

| | | |
|---|---|---|
| 661,549 | Parks | Nov. 13, 1900 |
| 868,610 | Misko | Oct. 15, 1907 |
| 1,081,532 | Humbert | Dec. 16, 1913 |
| 1,335,370 | Ellis | Mar. 30, 1920 |
| 2,049,004 | Flannery | July 28, 1936 |
| 2,243,514 | Tigerschiold | May 27, 1941 |
| 2,643,185 | Carter | June 23, 1953 |
| 2,692,196 | Hulme | Oct. 19, 1954 |
| 2,739,056 | Heimberg | Mar. 20, 1956 |

OTHER REFERENCES

Wood et al.: "Desulphurization of Pig Iron with Calcium Carbide," A. I. M. E., vol. 140 (1940), pages 87–105, inclusive.

Thorpes Dictionary of Applied Chemistry, vol. II, pages 215–216, 4th edition.